(12) United States Patent
Herbrich et al.

(10) Patent No.: US 8,781,915 B2
(45) Date of Patent: Jul. 15, 2014

(54) RECOMMENDING ITEMS TO USERS UTILIZING A BI-LINEAR COLLABORATIVE FILTERING MODEL

(75) Inventors: Ralf Herbrich, Cambridge (GB); Thore Graepel, Cambridge (GB); David Stern, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1305 days.

(21) Appl. No.: 12/253,854

(22) Filed: Oct. 17, 2008

(65) Prior Publication Data

US 2010/0100416 A1    Apr. 22, 2010

(51) Int. Cl.
*G06Q 10/00*     (2012.01)

(52) U.S. Cl.
USPC .......................................... 705/26.7; 705/347

(58) Field of Classification Search
USPC .................................. 705/26.7, 347
See application file for complete search history.

(56) References Cited

U.S. PATENT DOCUMENTS

| | | | | |
|---|---|---|---|---|
| 5,704,017 A * | 12/1997 | Heckerman et al. | ............ | 706/12 |
| 5,790,935 A * | 8/1998 | Payton | ............ | 725/91 |
| 6,029,161 A | 2/2000 | Lang et al. | | |
| 6,041,311 A * | 3/2000 | Chislenko et al. | ........... | 705/26.7 |
| 6,049,777 A * | 4/2000 | Sheena et al. | ................ | 705/7.32 |
| 6,064,980 A * | 5/2000 | Jacobi et al. | ................. | 705/26.7 |
| 6,321,170 B1 * | 11/2001 | Wurgler et al. | ................. | 702/76 |
| 6,412,012 B1 * | 6/2002 | Bieganski et al. | ............ | 709/232 |
| 6,633,852 B1 * | 10/2003 | Heckerman et al. | ......... | 705/7.29 |
| 6,850,252 B1 * | 2/2005 | Hoffberg | ..................... | 715/716 |
| 6,865,546 B1 * | 3/2005 | Song | ............................ | 705/7.18 |
| 6,868,525 B1 * | 3/2005 | Szabo | ............................ | 715/738 |
| 7,050,868 B1 * | 5/2006 | Graepel et al. | ................... | 700/93 |
| 7,310,626 B2 | 12/2007 | Scarborough et al. | | |
| 7,359,550 B2 * | 4/2008 | Brand | ............................ | 382/181 |
| 7,376,474 B2 | 5/2008 | Graepel et al. | | |
| 7,389,201 B2 | 6/2008 | Chickering et al. | | |
| 7,480,640 B1 | 1/2009 | Elad et al. | | |
| 7,574,422 B2 * | 8/2009 | Guan et al. | ............................ | 1/1 |
| 7,584,171 B2 * | 9/2009 | Guan et al. | ............................ | 1/1 |
| 7,590,616 B2 * | 9/2009 | Guan et al. | ............................ | 1/1 |
| 7,596,538 B1 | 9/2009 | Owen et al. | | |
| 7,647,289 B2 * | 1/2010 | Graepel et al. | ................. | 706/62 |

(Continued)

OTHER PUBLICATIONS

Das, Abhindandan et al., Google News Personalization: Scalable Online Collaborative Filtering ACM WWW2007 Industrial Practice and Experience, May 8-12, 2007.*

(Continued)

*Primary Examiner* — Scott L Jarrett
(74) *Attorney, Agent, or Firm* — Pablo Tapia; Jim Ross; Micky Minhas

(57) ABSTRACT

A recommender system may be used to predict a user behavior that a user will give in relation to an item. In an embodiment such predictions are used to enable items to be recommended to users. For example, products may be recommended to customers, potential friends may be recommended to users of a social networking tool, organizations may be recommended to automated users or other items may be recommended to users. In an embodiment a memory stores a data structure specifying a bi-linear collaborative filtering model of user behaviors. In the embodiment an automated inference process may be applied to the data structure in order to predict a user behavior given information about a user and information about an item. For example, the user information comprises user features as well as a unique user identifier.

15 Claims, 14 Drawing Sheets

(56) References Cited

U.S. PATENT DOCUMENTS

| | | | |
|---|---|---|---|
| 7,840,986 B2* | 11/2010 | Ali et al. ................... | 725/105 |
| 7,953,676 B2* | 5/2011 | Agarwal et al. ............. | 706/12 |
| 2002/0174429 A1 | 11/2002 | Gutta et al. | |
| 2002/0199186 A1 | 12/2002 | Ali et al. | |
| 2003/0234812 A1 | 12/2003 | Drucker et al. | |
| 2004/0054572 A1* | 3/2004 | Oldale et al. ............... | 705/10 |
| 2004/0083195 A1 | 4/2004 | McCord et al. | |
| 2004/0103058 A1 | 5/2004 | Hamilton | |
| 2005/0193002 A1 | 9/2005 | Souders et al. | |
| 2007/0078849 A1 | 4/2007 | Slothouber | |
| 2007/0150428 A1* | 6/2007 | Webb ......................... | 706/46 |
| 2007/0288413 A1 | 12/2007 | Mizuno et al. | |
| 2008/0097821 A1 | 4/2008 | Chickering et al. | |
| 2008/0120288 A1 | 5/2008 | Guan et al. | |
| 2008/0126303 A1* | 5/2008 | Park et al. ................... | 707/3 |
| 2008/0177726 A1 | 7/2008 | Forbes et al. | |
| 2008/0215411 A1 | 9/2008 | Hu et al. | |
| 2009/0204234 A1 | 8/2009 | Sustaeta et al. | |
| 2010/0030578 A1* | 2/2010 | Siddique et al. ............ | 705/3 |
| 2011/0061076 A1* | 3/2011 | Ali et al. ..................... | 725/46 |

OTHER PUBLICATIONS

Watanabe, Toshihiko et al., Improvement of Collaborative Filtering Based on Fuzzy Reasoning Model 2006 IEEE International Conference on Systems, Man and Cybernetics, Oct. 8-11, 2006.*

Minka, Tom, Bayesian inference in dynamic models—an overview Microsoft Research, Mar. 22, 2007.*

Ranganathan, Assumed Density Filtering Nov. 23, 2004.*

Stern, David et al., Matchbox: Large Scale Online Bayesian Recommendations ACM WWW 2009, Apr. 20-24, 2009.*

Park, Seung-Taek et al., Applying Collaborative Filtering Techniques to Movie Search for Better Ranking and Browsing ACM KDD'07, Aug. 12-15, 2007.*

Claypool, Mark et al., Inferring User Interest Computer Science Technical Report Series, Worcester Polytechnic Institute, May 2001.*

Minka, Thomas P., Expectation Propagation for Approximate Bayesian Inference Carnegie Mellon University, 2000.*

Chu, Wei et al., Personalized Recommendation on Dynamic Content Using Predictive Bilinear Models ACM WWW 2009, Social Networks and Web 2.0, Recommender Systems, Apr. 20-24, 2009.*

Billsus, Daniel et al., Adaptive News Access The Adaptive Web, LNCS 4321, 2007.*

Bielinska, Ewa M., Minimum Variance Prediction of Bilinear Time Series: Direct and Adaptive Versions Journal of Forecasting, vol. 12, No. 6, Aug. 1993.*

Liu, Yamei, Overfitting and forecasting: linear versus non-linear time series models Iowa State University, 2000.*

Breese, John S. et al., Empirical Analysis of Predictive Filtering Algorithms for Collaborative Filtering Microsoft Research, Technical Report, MSR-TR-98-12, Oct. 1998.*

Yim, Yew Jin et al., Varionational Bayesian Approach to Movie Rating Prediction KDDCup'07, Aug. 12, 2007.*

Richardson, Matthew et al., Predicting Clicks: Estimating the Click-Through Rate for New Ads Microsoft Research, ACM, WWW2007, May 8-12, 2007.*

Wang, Jun et al., Probabilistics Relevance Ranking for Collaborative Filtering Information Retrieval, vol. 11, No. 6, 2008.*

Huang, Zan et al., A Comparison of Collaborative Filtering Recommendation Algorithms for E-commerce IEEE Intelligent Systems, 2007.*

Linden, Greg et al., Amazon.com Recommendations IEEE Internet Computing, 2003.*

Kschischang, Frank R. et al., Factor Graphs and the Sum-Product Algorithm IEEE Transactions on Information Theory, vol. 47, No. 2, Feb. 2001.*

Che, Sonny Han Seng, RecTree: A Linear Collaborative Filtering Algorith Simon Fraser University, Sep. 2000.*

Lee, Jong Joo et al., Understanding collaborative filitering parameters for personalized recommendations in e-commerce Electron Commerce Research, vol. 7, 2007.*

Bennett, et al., "The Netflix Prize", In Proceedings of KDD Cup and Workshop, 2007, 4 pages.

Boley, et al., "Collaborative Filtering and Inference Rules for Context-Aware Learning Object Recommendation", retrieved on Aug. 22, 2008 at <<http://iit-iti.nrc-cnrc.gc.ca/iit-publications-iti/docs/NRC-48535.pdf>>, Troubador Publishing, 2005, pp. 179-188.

Breese, et al., "Empirical Analysis of Predictive Algorithms for Collaborative Filtering", In Proceedings of the 14th ACM Conference on Uncertainty in Artificial Intelligence, 1998, pp. 34-52.

Chen, "Context-Aware Collaborative Filtering System: Predicting the User's Preference in the Ubiquitous Computing Environment", retrieved on Aug. 22, 2008 at <<http://www.ibao.net/papers/cacf-loca05.pdf>>, Springer-Verlag Berlin Heidelberg, 2005, pp. 244-253.

Dangauthier, et al., "TrueSkill Through Time: Revisiting the History of Chess", In Advances in Neural Information Processing Systems 20, 2008, pp. 1-8 (337-344).

Goldberg, et al, "Using Collaborative Filtering to Weave an Information Tapestry", Communications of the ACM, vol. 35, No. 12, 1992, pp. 61-70.

Good, "Combining Collaborative Filtering with Personal Agents for Better Recommendations", retrieved on Aug. 22, 2008 at <<http://www.cs.ubc.ca/~conati/532b/papers/good-konstan-aaai-99.pdf>>, American Assocation for Artificial Intelligence, 1999, 8 pgs.

Herbrich, et al., "TrueSkill: A Bayesian Skill Rating System", In Advances in Neural Information Processing Systems 20, 2007, pp. 1-9 (569-576).

Kschischang, et al., "Factor Graphs and the Sum-Product Algorithm", IEEE Transactions on Information Theory, vol. 47, No. 2, 2001, pp. 498-519.

Lam, et al., "Addressing Cold-Start Problem in Recommendation Systems", In Proceedings of the 2nd international conference on Ubiquitous information management and communication, 2008, pp. 208-211.

Lim, et al., "Variational Bayesian Approach to Movie Rating Prediction", In Proceedings of KDD Cup and Workshop, 2007, pp. 15-21.

Minka, "Divergence measures and message passing", Technical Report MSR-TR-2007-173, Microsoft Research Ltd, 2005, 15 pages.

Netflix Cinematch, retrieved on Aug. 22, 2008 at <<http://beelan515-yahoo-com.wikidot.com/netflix-cinematch>>, pp. 1-2.

Resnick, et al., "Recommender Systems", Communications of the ACM, vol. 40, No. 3, 1997, pp. 56-58.

Salakhutdinov, et al., "Restricted Boltzmann Machines for Collaborative Filtering", In Proceedings of the 24th Annual International Conference on Machine Learning, 2007, pp. 791-798.

Schafer, et al., "Recommender systems in E-commerce", In Proceedings of the 1st ACM Conference on Electronic commerce, ACM, 1999, pp. 158-166.

Winn, "Variational Message Passing and its Applications", PhD thesis, Department of Physics, University of Cambridge, 2003, pp. ii-xii.

Chu, Ghahramani, "Gaussian Processes for Ordinal Regression", retrieved on Oct. 13, 2009 at <<http://learning.eng.cam.ac.uk/zoubin/papers/chu05a.pdf>>, Journal of Machine Learning Research, vol. 6, Jul. 2005, pp. 1019-1041.

Gomes, Selman, "Algorithm Portfolio Design: Theory vs. Practice", retrieved on Oct. 13, 2009 at <<http://www.cs.cornell.edu/selman/papers/pdf/97.uai.algorithm.pdf>>, Proceedings of the Thirteenth Conference on Uncertainty in Artificial Intelligence, 1997, pp. 190-197.

Gomes, Selman, Crato, Kautz, "Heavy-Tailed Phenomena in Satisfiability and Constraint Satisfaction Problems", retrieved on Oct. 13, 2009 at <<http://www.cs.cornell.edu/gomes/jar.pdf>>, Kluwer Academic Publishers, Netherlands, Journal of Automated Reasoning, vol. 24, 2000, pp. 67-100.

Horvitz, Ruan, Gomes, Kautz, Selman, Chickering, "A Bayesian Approach to Tackling Hard Computational Problems", retrieved on Oct. 13, 2009 at <<ftp://ftp.research.microsoft.com/pub/ejh/uai2k1.pdf>>, Morgan Kaufmann Publishers: San Francisco, Proceedings of the Seventeenth Conference on Uncertainty and Artificial Intelligence, Aug. 2001, pp. 1-10.

(56) References Cited

OTHER PUBLICATIONS

Lemire, Boley, McGrath, Ball, "Collaborative Filtering and Inference Rules for Context-Aware Learning Object Recommendation", retrieved on Oct. 13, 2009 at <<http://iit-iti.nrc-cnrc.gc.ca/iit-publications-iti/docs/NRC-48535.pdf>>, Troubador Publications, UK, Technology and Smart Education, vol. 2, No. 3, Aug. 2005. pp. 179-188.

Leyton-Brown, Nudelman, Shoham, "Empirical Hardness Models: Methodology and a Case Study on Combinatorial Auctions", retrieved on Oct. 13, 2009 at <<http://delivery.acm.org/10.1145/1540000/1538906/a22-leyton-brown.pdf?key1=1538906&key2=7885145521&coll=GUIDE&dl=GUIDE&CFID=56211091&CFTOKEN=34606863>>, Journal of the ACM, vol. 56, No. 4, Article 22, Jun. 2009, pp. 1-52.

Pulina, Tacchella, "A Self-Adaptive Multi-Engine Solver for Quantified Boolean Formulas", retrieved on Oct. 13, 2009 at <<http://cat.inist.fr/?aModele=afficheN&cpsidt=21207737>>, Springer, Heidelberg, Constraints Journal, vol. 14, 2009, pp. 136.

Pulina, Tacchella, "Time to learn or time to forget? Strengths and weaknesses of a self-adaptive approach to reasoning in quantified Boolean formula", Conference on Principles and Practice of Constraint Programming (Doctoral Programme), 2008, pp. 66-71.

Rice, "The Algorithm Selection Problem", Academic Press, Advances in Computers, vol. 15, 1976, pp. 65-118.

Samulowitz, "Solving Quantified Boolean Formulas", retrieved on Oct. 13, 2009 at <<o:\docs\MS6\0196US\KH9057. PDF>>, Graduate Department of Computer Science, University of Toronto (Doctoral Thesis), 2008, pp. 1-166.

Smith-Miles, "Cross-Disciplinary Perspectives on Meta-Learning for Algorithm Selection", retrieved on Oct. 13, 2009 at <<http://delivery.acm.org/10.1145/1460000/1456656/a6-smith-miles.pdf?key1=1456656&key2=8216145521&coll=GUIDE&dl=GUIDE&CFID=56211554&CFTOKEN=77346948>>, ACM Computing Surveys, vol. 41, No. 1, Article 6, Dec. 2008, pp. 1-25.

Stern, Herbrich, Graepel, "Matchbox: Large Scale Online Bayesian Recommendations", retrieved on Oct. 13, 2009 at <<http://www2009.org/proceedings/pdf/p111.pdf>>, International World Wide Web Conference Committee, WWW 2009, Apr. 20, 2009, pp. 111-120.

Streeter, Smith, "New Techniques for Algorithm Portfolio Design", retrieved on Oct. 13, 2009 at <<http://uai2008.cs.helsinki.fi/UAI_camera_ready/streeter.pdf>>, The Robotics Institute Carnegie Mellon University, pp. 1-9.

Xu, Hutter, Hoos, Leyton-Brown, "SATzilla: Portfolio-based Algorithm Selection for SAT", retrieved on Oct. 13, 2009 at <<http://www.aaai.org/Papers/JAIR/Vol32/JAIR-3214.pdf>>, Journal of Artificial Intelligence Research, vol. 32, Jun. 2008, pp. 565-606.

\* cited by examiner

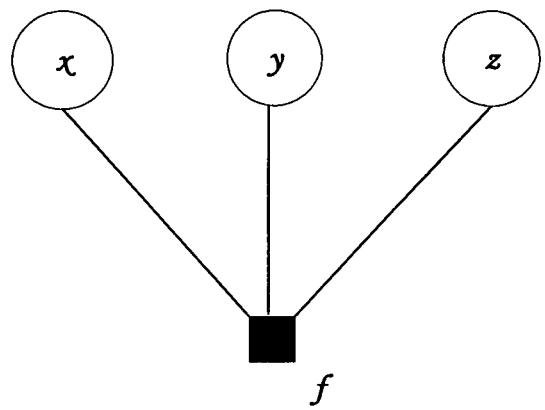
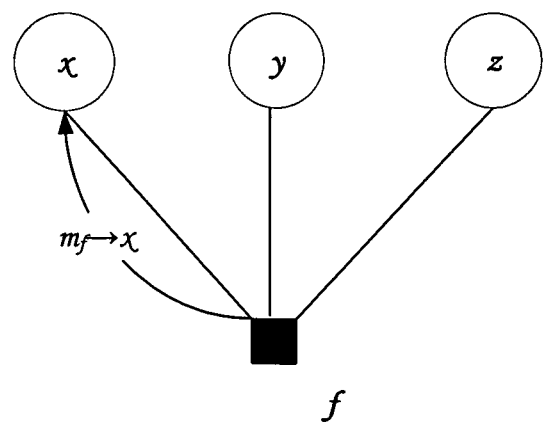
FIG. 10

| Factor | Update equation |
|---|---|
| $\mathcal{N}(x; m, v^2)$ with $m_{f \to x}$ | $\pi_x^{\text{new}} \leftarrow \pi_x + \dfrac{1}{v^2}$<br>$\tau_x^{\text{new}} \leftarrow \tau_x + \dfrac{m}{v^2}$<br><br>This is exact and should only be executed once |
| $\mathcal{N}(x; y, c^2)$ with $m_{f \to x}$ | $\pi_{f \to x}^{\text{new}} \leftarrow a\,(\pi_y - \pi_{f \to y})$<br>$\tau_{f \to x}^{\text{new}} \leftarrow a\,(\tau_y - \tau_{f \to y})$<br>$\pi_x^{\text{new}} \leftarrow \pi_x + \pi_{f \to x}^{\text{new}} - \pi_{f \to x}$<br>$\tau_x^{\text{new}} \leftarrow \tau_x + \tau_{f \to x}^{\text{new}} - \tau_{f \to x}$<br>$a := \dfrac{1}{1 + c^2\,(\pi_y - \pi_{f \to y})}$ |
| $\mathcal{N}(x; y, c^2)$ with $m_{f \to y}$ | $\mathcal{N}(y; x, c^2)$ with $m_{f \to y}$ |

FIG. 11

| Factor | Update equation |
|---|---|
| $\mathbb{I}(x > \varepsilon)$ | $\pi_x^{\text{new}} \leftarrow \dfrac{c}{1 - w\left(\frac{d}{\sqrt{c}}, \varepsilon\sqrt{c}\right)}$ <br><br> $\tau_x^{\text{new}} \leftarrow \dfrac{d + \sqrt{c} \cdot v\left(\frac{d}{\sqrt{c}}, \varepsilon\sqrt{c}\right)}{1 - w\left(\frac{d}{\sqrt{c}}, \varepsilon\sqrt{c}\right)}$ <br><br> $\pi_{f \to x}^{\text{new}} \leftarrow \pi_{f \to x} + \pi_x^{\text{new}} - \pi_x$ <br> $\tau_{f \to x}^{\text{new}} \leftarrow \tau_{f \to x} + \tau_x^{\text{new}} - \tau_x$ <br><br> $c = \pi_x - \pi_{f \to x}, \qquad d = \tau_x - \tau_{f \to x}$ |
| $\mathbb{I}(|x| \leq \varepsilon)$ | $\pi_x^{\text{new}} \leftarrow \dfrac{c}{1 - w_0\left(\frac{d}{\sqrt{c}}, \varepsilon\sqrt{c}\right)}$ <br><br> $\tau_x^{\text{new}} \leftarrow \dfrac{d + \sqrt{c} \cdot v_0\left(\frac{d}{\sqrt{c}}, \varepsilon\sqrt{c}\right)}{1 - w_0\left(\frac{d}{\sqrt{c}}, \varepsilon\sqrt{c}\right)}$ <br><br> $\pi_{f \to x}^{\text{new}} \leftarrow \pi_{f \to x} + \pi_x^{\text{new}} - \pi_x$ <br> $\tau_{f \to x}^{\text{new}} \leftarrow \tau_{f \to x} + \tau_x^{\text{new}} - \tau_x$ <br><br> $c = \pi_x - \pi_{m_x}, \qquad d = \tau_x - \tau_{m_x}$ |

FIG. 13

RECOMMENDING ITEMS TO USERS UTILIZING A BI-LINEAR COLLABORATIVE FILTERING MODEL

BACKGROUND

Recommender systems are currently used by online providers of goods and services to select products and/or services that might be of interest to customers or other users. For example, a customer who has previously bought books and DVDs from an online provider may access a web site of that provider and be presented with information about two or three other products that the customer might be interested in purchasing. The recommender system can direct the customer towards useful other goods and services in this way. This aids both the user or customer as well as the online provider. The customer does not need to spend time searching for other goods and services and may be directed to goods and services that might not otherwise have been found. The online provider gains increased sales as well as improved customer satisfaction and likelihood of repeat business in the future.

Recommender systems may be used in any situation in which it is required to select items for specified users. The users may be human users or automated users. The items may be goods, services, advertisements, people, other users, companies, institutions, or other entities. For example, a social networking site may use a recommender system to recommend users to other users. A web search engine may use a recommender system to recommend products and services to a user. An online provider of movies may use a recommender system to recommend movies to users.

Some previous recommender systems have used a content-based approach whereby descriptions of both the user and the item are used. For example, for a user the descriptions may comprise feature vectors storing user details such as a user's age, sex, native language and the like. For an item, the descriptions may comprise feature vectors storing item details such as price, author, manufacturer and the like.

Other previous recommender systems have used collaborative filtering approaches. In this case, abstract identifications of users and items are used (such as product codes and customer numbers). Ratings are observed for user-item pairs and used to form a matrix of such ratings for every user-item pair. The ratings indicate how useful an item is to a particular user. The ratings may be explicit, for example, where users are asked to provide the ratings. The ratings may be implicit, for example, they may be inferred from user behavior such as purchases or click data. Recommender systems using collaborative filtering approaches may suffer from a "cold start" problem whereby performance is poor early on when the matrix of ratings is under-populated.

There is a desire to improve the relevance of results produced by recommender systems and to achieve this in a manner that reduces resource requirements (such as processor and memory requirements). There is also a need to made recommendations in real-time with respect to queries. That is, if a user makes a search query to find a particular product, service, other user, or item, the recommender system is desired to provide a recommendation in time for that recommendation to be provided together with the search results. There is also a desire to enable a recommendation system to be updated on-the-fly such that user feedback about recommended items is taken into account as soon as possible. Where large numbers of users and items are involved (which is normal for most recommender system applications, especially those using content-based approaches) these problems are particularly acute. For example, a recommender system may be required to be scalable to applications involving hundreds of thousands of users and billions of ratings.

The embodiments described below are not limited to implementations which solve any or all of the problems mentioned above.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A recommender system may be used to predict a user behavior that a user will make in relation to an item. In an embodiment such predictions are used to enable items to be recommended to users. For example, products may be recommended to customers, potential friends may be recommended to users of a social networking tool, organizations may be recommended to automated users or other items may be recommended to users. In an embodiment a memory stores a data structure specifying a bi-linear collaborative filtering model of user behavior. In the embodiment an automated inference process may be applied to the data structure in order to predict a user behavior given information about a user and information about an item. For example, the user information comprises user features as well as a unique user identifier. In some embodiments the data structure comprises a factor graph and the inference process comprises carrying out message passing over the factor graph using an assumed density filtering process.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 10 shows two example factor graphs;

FIGS. 11 and 12 are tables of message update equations for exact factor nodes;

FIG. 13 is a table of message update equations for order factor nodes;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a recommender system for recommending items to users based on previous explicit ratings each user has given to certain items, the system described is provided as an example and not a limitation. As those skilled in the art will appreciate, the present examples are suitable for application in a variety of different types of recommender systems where the ratings may be implicit, or where any information indicating how useful a user found a certain item may be used.

Although the present examples are described and illustrated herein as being for predicting a rating that a user gives to an item the examples are also suitable for predicting any user behavior made by a user in response to an item. For example, a click event, a product purchase, a user interface input event, or other action made by a user.

Figure 1:
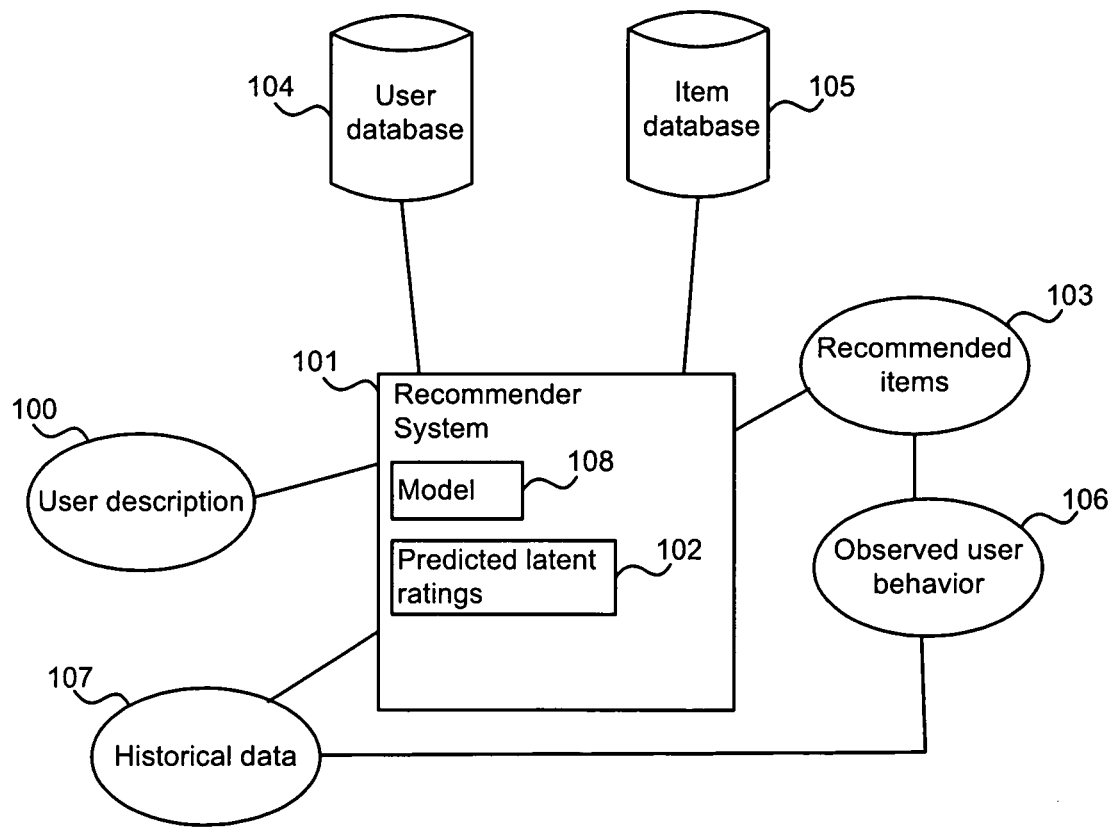
FIG. 1 is a schematic diagram of an example recommender system.

FIG. 1 is a schematic diagram of an example recommender system 101. The recommender system may be implemented using a general purpose computer or any suitable processor. It is arranged to receive a user description 100 which may comprise only a user identifier (such as a customer number or code), or, in some embodiments, a user identifier as well as one or more features describing the user (such as the user's age, sex, native language, or other user data). The recommender system may optionally have access to a user database 104 which stores user descriptions.

The recommender system has access to an item database 105 which stores item descriptions. In some embodiments an item description is only an item identifier such as a product code or other number. In other embodiments an item description comprises an item identifier as well as one or more features describing the item (such as price, manufacturer, or other item data).

The recommender system comprises a model 108 stored in memory. Examples of this model are described below. The model is a probabilistic model which enables a latent rating to be predicted given a user description and an item description. A latent rating is an unobserved variable related to a rating that a user is predicted to give an item. Given a particular user description 100 the recommender system 101 is able to use the model 108 to generate predicted latent ratings 102 for each of the item descriptions in the item database 105. Using these predicted latent ratings 102 the recommender system is arranged to select one or more of the item descriptions and recommend the corresponding items 103 to the user. The selection is made on the basis of the predicted latent ratings 102 in any suitable manner. For example, the items with the top five predicted latent ratings are selected and presented as a ranked list.

User behavior is observed relating to the recommended items. For example, if the user makes a purchase of one of the recommended items or if a user clicks on a link to one of the recommended items. The observed user behavior 106 may be input to the recommender system 101 as historical data 107. Other historical data 107 may also be input comprising observed user description, item description and rating triples. The recommender system 101 comprises a machine learning system which trains the model 108 using the historical data 107.

In some embodiments where the user descriptions and the item descriptions comprise only identifiers, the model is a collaborative filtering model. In other embodiments where the user descriptions and the item descriptions comprise identifiers and features, the model is a combined collaborative filtering model and content-based approach model.

In embodiments where the model is a combined collaborative filtering model and content-based approach model it is possible to produce improved predictions for users new to the system (due to their description in terms of features, such as sex, age, job) as compared with purely collaborative filtering based approaches. In addition, it is possible to make accurate, personalized, predictions for longer term users because user IDs are taken into account by the model.

Figure 2:
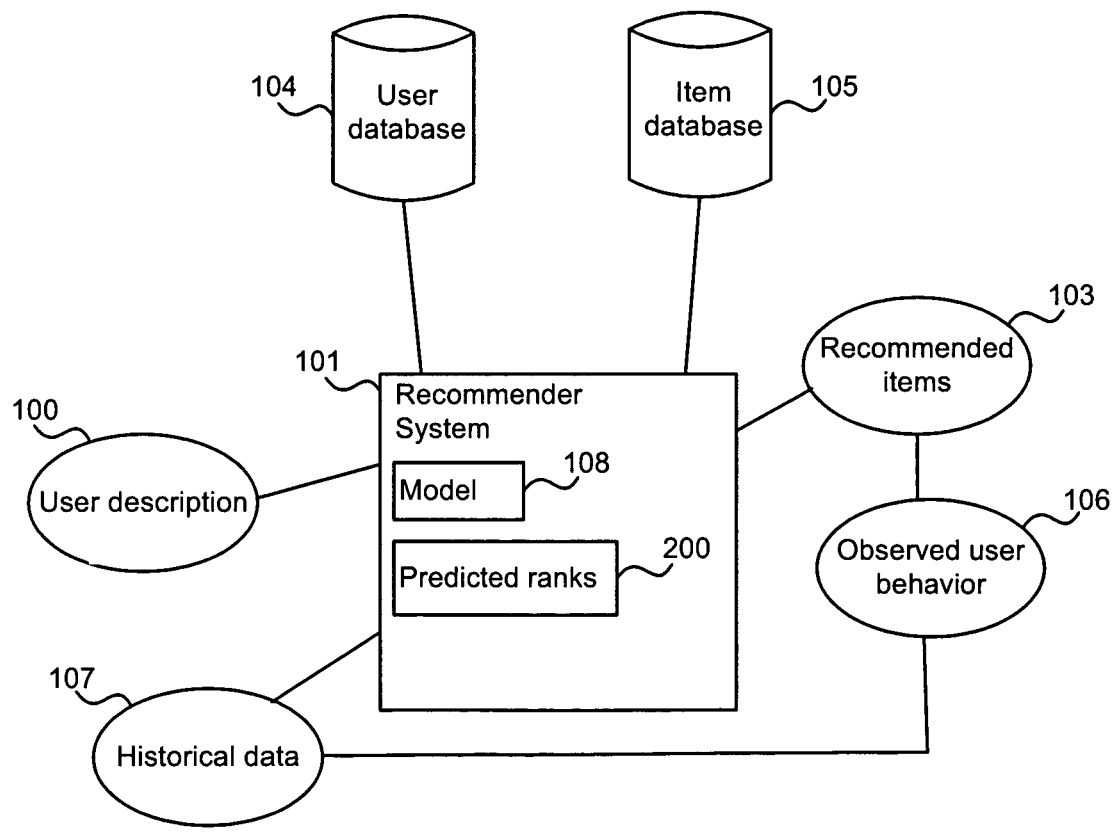
FIG. 2 is a schematic diagram of another example recommender system.

As illustrated in FIG. 2 the recommender system may be arranged to produce predicted ranks 200. The predicted ranks may be obtained from the predicted latent ratings by using user-specific thresholds. If a predicted latent rating falls between two specified thresholds it becomes a particular rank. The specified thresholds may themselves be learnt by the recommender system. Thus in some embodiments, the recommender system is able to learn a user-specific rating scale and this is described in more detail below.

Figure 3:
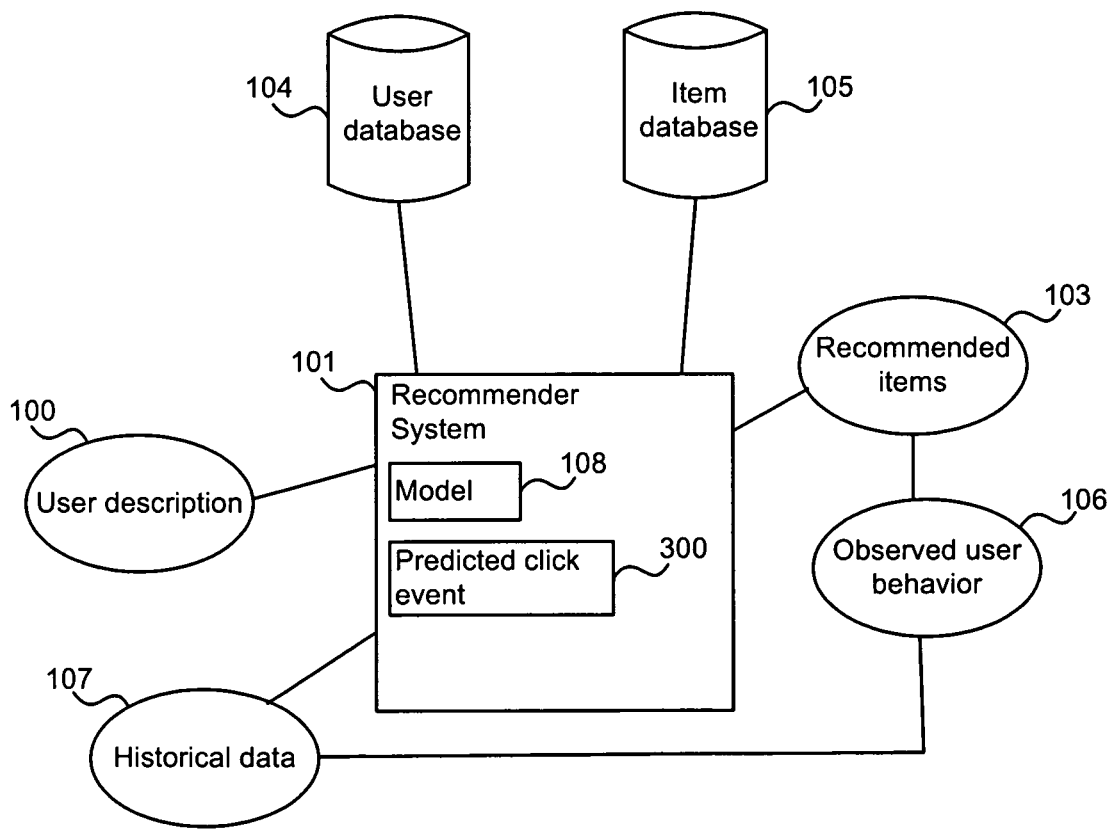
FIG. 3 is a schematic diagram of another example recommender system.

As illustrated in FIG. 3 the recommender system may be arranged to produce predicted click events 300. In this case, the recommender system, given a user description and an item description, predicts whether the user will click on the item if it is presented. These predicted click events 300 may be used to select items to recommend 103 or may be used for any other suitable purpose.

The model 108 stored at the recommender system may be a probabilistic, bi-linear model. For example, the model combines two linear models, one of an item and one of a user. For example, each user is represented by a set of true/false features such as "age=20", "occupation=programmer", "sex=male" and a unique identifier (ID). For example, each item is represented by a set of features such as "genre=War", "date=1$^{st}$ Dec" and "ID=23987" in the case that the items are movies. In the following description, we will denote an index over features by j. Each feature is mapped to a vector of floating-point numbers referred to herein as a "trait vector" as each element of the trait vector corresponds to a particular trait of the feature. The ith trait of feature j is denoted $v_{ij}$ in the following. Any suitable data structure may be used to store these vectors such as an array, list, or a hash table.

For each user it is possible to calculate a total trait vector s as a weighted sum of all user feature trait vectors. The weights, x, depend on the user in question. Similarly, for each item it is possible to calculate a single trait vector t as a weighted sum of all item feature trait vectors with the weights, y, depending on the item in question. In some embodiments sparsely active binary features are used (such as user "ID=1234" or "age>18" and the total user trait vector may then be calculated by summing the user trait vectors for each of the features active for the particular user (corresponding to the non-zero elements of x).

In other words, there is a linear model for each item trait vector given by:

$$t_i = \sum_j v_{ij} y_j$$

and a linear model for each user trait vector given by:

$$s_i = \sum_j u_{ij} x_j$$

where $u_{ij}$ and $v_{ij}$ are the latent feature trait values to be learnt as described below and x is a user feature vector and y is an item feature vector.

The combination rule for combining the two linear models may comprise an inner product of the latent item traits and latent user traits:

latent rating, r, is proportional to $s^T t$. The inner product is comprised of the sum over the pairwise products of the components.

The latent rating r is also an unobserved variable. The latent rating a particular user gives to a particular item may be modeled as the inner product of the corresponding user and item latent trait vectors.

Figure 4:
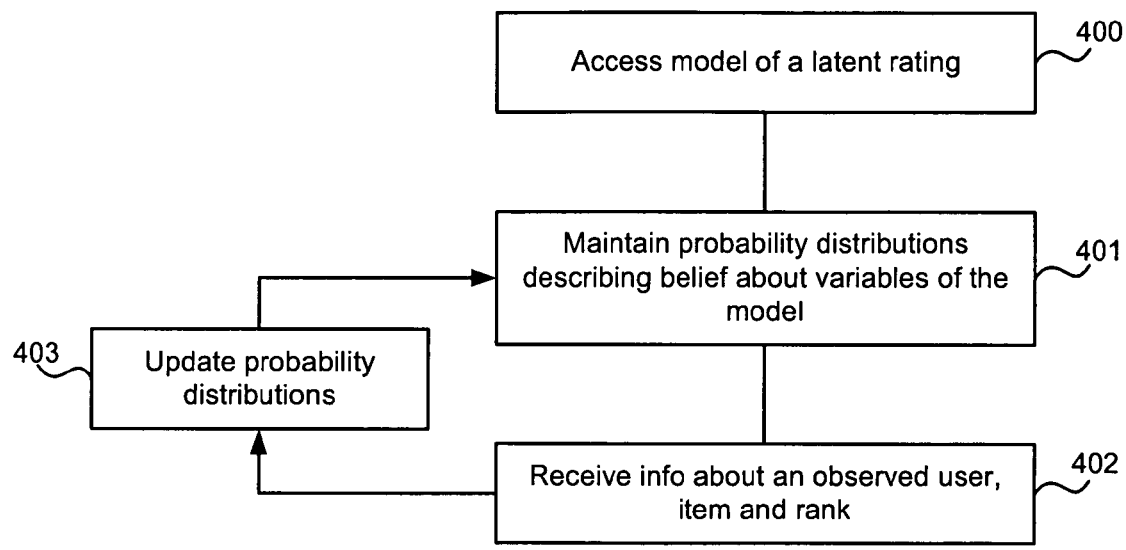
FIG. 4 is a block diagram of an example method of training a recommender system.
Figure 5:
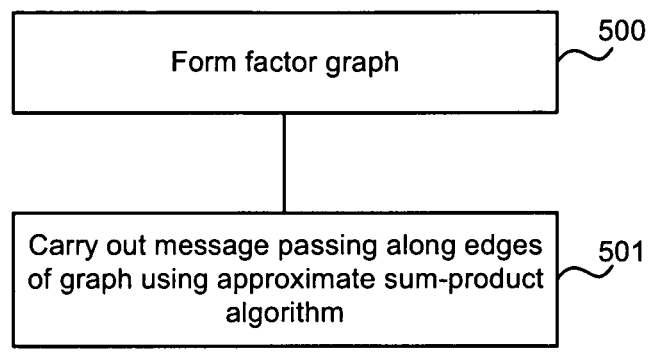
FIG. 5 gives more detail of an example of part of the method of FIG. 4.

Thus the model at the recommender system may be of a latent rating. FIG. 4 is a block diagram of a method at the recommender system of training the model. It comprises accessing 400 the model 108, which may be a model of a latent rating, the model having variables which may be latent user traits and latent item traits. The recommender system is arranged to maintain probability distributions describing belief about the variables of the model (block 401). Any suitable probability distribution type may be used such as a Gaussian distribution. When information is received about an observed user, item and associated rank (block 402) this information is used to update the probability distributions (block 403). This update process may be repeated for all available historical data.

Learning a probability distribution for each model variable is a complex and technically difficult task requiring significant memory resources. In an embodiment, assumed-density filtering is used to achieve this learning process and particular data structures, referred to as factor graphs, are formed in memory. Ratings may be observed one at a time and the observed information is incorporated into the model before moving on to the next rating (as explained above with reference to FIG. 4). In this way memory overhead may be reduced and the recommender system is able to update immediately after each rating without the need to revisit old data.

In an embodiment the update process is carried out by arranging the recommender system to build a factor graph in memory (block 500) for each observed rating. Some of the nodes of the factor graph are instantiated with the observed user, item and rank information and message passing is carried out along edges of the factor graph using an approximate sum-product algorithm (block 501). Approximations may be made using Expectation Propagation (EP) and Variational Message Passing (VMP). In this way, statistics describing the probability distributions are updated (block 403 of FIG. 4).

Once the model is trained it is possible to carry out prediction for a new pair of user features x and item features y. In this way a predicted latent rating is obtained for a specified user and item pair. This may be repeated to obtain predicted latent ratings for many items given a particular user. Using the predicted latent ratings items may then be selected for recommending to the user.

The method described with respect to FIG. 4 may also be used to update the model on the fly as new ratings are made, without having to revisit previous data (in contrast with some previous recommender systems). Because it is not necessary to revisit previous data the recommender system is very efficient. As a result, user experience may be improved as the system is able to adapt to a users taste immediately even within a single user session. In addition, in some embodiments, the recommender system is arranged to take into account the effect of a user's preferences and an item's popularity changing with time. In some embodiments, the data structures used to store and enable the model to be updated are specially designed in order to enable parallel hardware to be used. This improves scalability of the recommender system.

In some embodiments parallel hardware is used by the recommender system in order to speed up operation. Any suitable parallel hardware may be used. In order to enable the parallel hardware to be used effectively the recommender system incorporates a monitor as now described with reference to FIG. 6. Using parallel hardware is typically not straightforward as concurrently executed instructions may conflict with one another producing unwanted or unexpected results. By carefully arranging the recommender system to form the factor graph data structures in a particular manner and by using the monitor described below it is possible to use parallel hardware.

Figure 6:
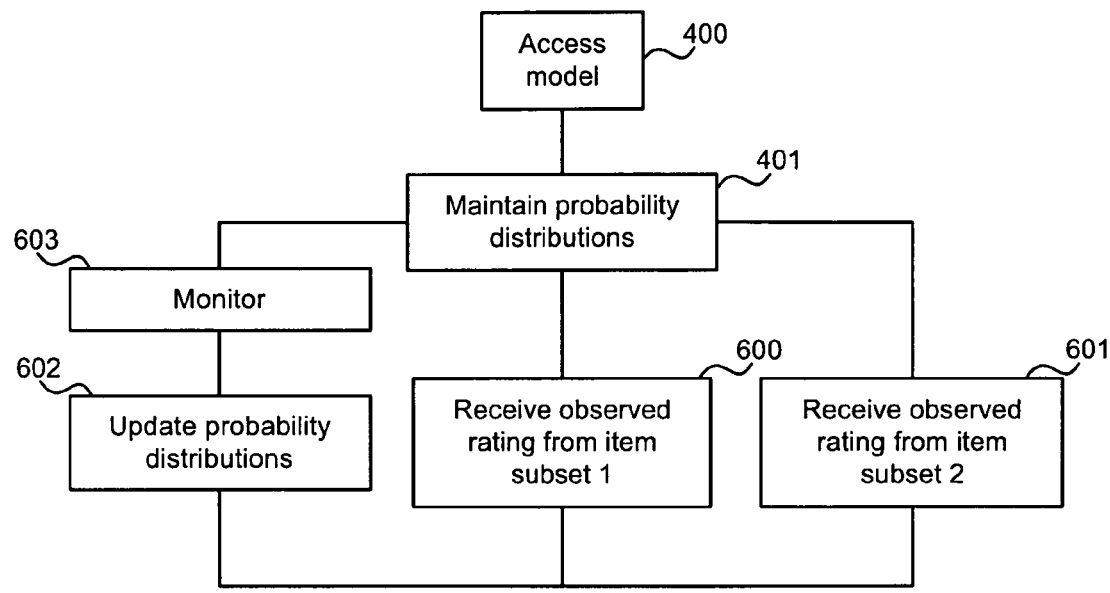
FIG. 6 is a block diagram of an example method of operating a recommender system using parallel processing.

The recommender system accesses the model (block 400) and maintains probability distributions (block 401) describing belief about the variables of the model. The recommender system receives two or more parallel streams of ratings from different subsets of the items at the same time. This is illustrated in FIG. 6 as two parallel streams of ratings 600 and 601 from two subsets of items. The received observed rating, item and user data is used to update the probability distributions (block 602) as described above with reference to FIG. 4. However each update is treated as an atomic transaction and a monitor 603 is used at the recommender system to ensure that if a single user variable is to be updated based on two different item ratings (because, for example, this user rated both items) then these are processed in series. In this way the monitor is arranged to prevent conflict in the concurrent updates to the model. In other embodiments, the parallel streams of ratings are from different subsets of users. In this case the monitor is used to ensure that if a single item variable is to be updated based on two different user ratings (because, for example, this item was rated by both users) then these are processed in series.

Figure 7:
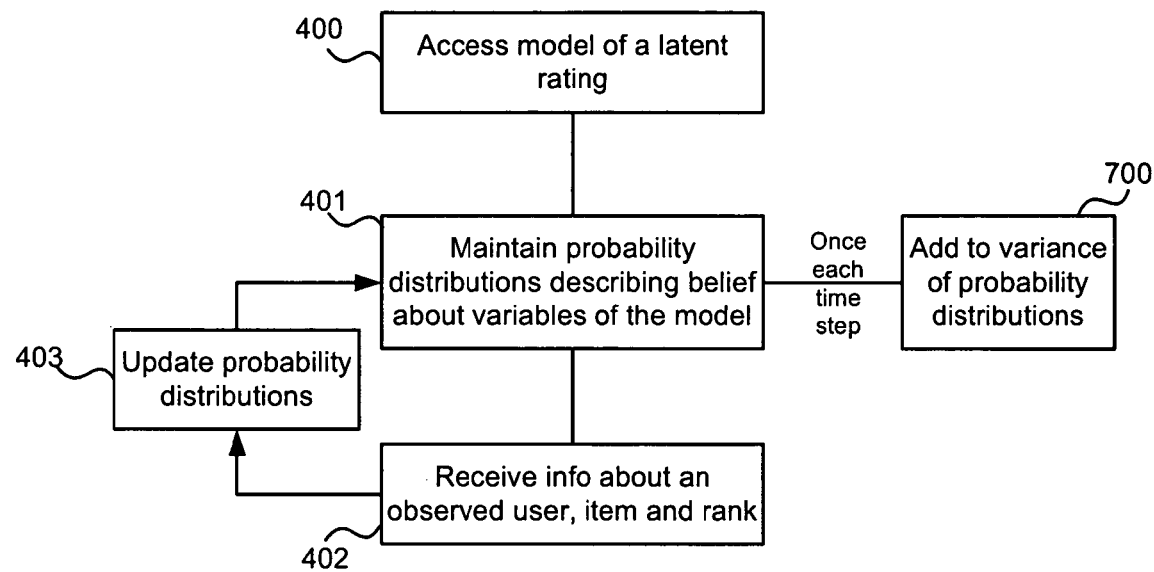
FIG. 7 is a block diagram of another example method of operating a recommender system.

In some embodiments the recommender system is arranged to take into account the possibility of a user's taste changing with time and/or an item's popularity changing with time. This is achieved by increasing the variance of the probability distribution associated with each latent trait at specified time intervals. For example, the time interval may be a day so that the variance is increased once per day. Any other suitable time step may be used depending on the particular application that the recommender system is being used for. For example, the variance may be increased by adding Gaussian noise to the probability distribution (which may be a Gaussian distribution). FIG. 7 is the same as FIG. 4 and in addition shows the step 700 at which the variance of the probability distributions may be increased.

In some embodiments the recommender system is arranged to learn, for each user, a particular scale used by that user to rate items. For example, users may make ratings in the form of discrete star values, with 5 stars for excellent, 4 stars for good, 3 stars for satisfactory and so on. The rating predicted by the recommender system is a latent variable and this is converted into a star value for an item by comparing the latent variable value to some specified thresholds. The specified thresholds may be learnt for each user. For example, the specified thresholds are learnt using Expectation Propagation as described in more detail below.

A particular example is now described in detail.

In an example, the recommender system receives triples (x,y,l) of user descriptions $x \in \mathbb{R}^n$, item descriptions $y \in \mathbb{R}^m$ and ranks $l \in \{1, \ldots L\}$. The ranks form an ordinal scale and can only be compared where $i \succ j \Leftrightarrow l_i > l_j$. The model assumes that there exists a latent rating $r \in \mathbb{R}$ which is stochastically generated as follows:

$$p(r|x,y,U,V,u,v) := N(r; \bar{r}(x,y,U,V,u,v), \beta^2), \quad (1)$$

where $N(t; \mu, \sigma^2)$ denotes the density at t of a Gaussian distribution with mean $\mu$ and variance $\sigma^2$. The expected rating is given by $$\bar{r}(x,y,U,V,u,v) := x^T U^T V y + x^T u + y^T v. \quad (2)$$

The matrices $U \in \mathbb{R}^{K \times n}$ and $V \in \mathbb{R}^{K \times n}$ and the vectors $u \in \mathbb{R}^n$ and $V \in \mathbb{R}^m$ are the variables of the model which map both users and items into the latent K-dimensional trait space via s:=Ux and via t:=Vy. The expected rating is then determined as the inner product between the low dimensional user and item representations shifted by both a user specific bias $x^T u$ and an item specific bias $y^T v$. Hence, the more aligned the vectors s and t are, the higher the expected rating r. Also, the expected rating is proportional to the length $\|s\|$ of the latent user traits and to the length $\|t\|$ of the latent item traits. The model may use low dimensional representations of both users and items. This enables recommender system to generalise across users and items, i.e., to learn from one user about another and from one item about another. Working with a small number K of latent traits, K<<m and K<<n, also has benefits in that the number of model variables to be stored is small. Both users and items can be described by arbitrary features.

Ordinal Regression Model

As described, the recommender system may predict a real-valued latent rating r but observations may be ranks, l. The main difference between ratings and ranks is that the latter can only be compared but not subtracted from each other. In order to address this, latent ratings may be related to ranks via a cumulative threshold model. For example, user-specific thresholds $b \in \mathbb{R}^{L-1}$ are used as follows:

$$\text{Rating level } l \Leftrightarrow \tilde{b}_{l-1} < r < \tilde{b}_l, \quad (3)$$

where $\tilde{b}_0 := -\infty$, $\tilde{b}_L := +\infty$ and $p(\tilde{b}_l|b_l) = N(\tilde{b}_l; b_l, \gamma^2)$. In other words, the latent rating axis is divided into L consecutive intervals $(b_{l-1}, b_l)$ of varying length each representing the region in which the user gives the same rank to an item. Though there is an over-parameterisation in scale if $x = e_i$—either the vector $u_i$ or b is scaled—the varying lengths of each interval call for a threshold model.

Dynamics Model

In order to address the issue of adapting to time-varying user preferences, item popularity and user rank models, the recommender system may arrange the latent variables U,V, u,v and b to vary with time. For example, for the threshold b a Gaussian dynamics model may be used, where $p(b_l^{(t+1)}|b_l^{(t)}) = N(b_l^{(t+1)}; b_l^{(t)}, \tau_b^2)$. Note that this dynamics model is anchored at $(t_0)$ where bland $b_l$ and $\tau_b^2$ are replaced by a prior mean $\mu_b$ and variances of $\sigma_b^2$. An analogous model is used for all other latent variables. Here, superscripts (t) are used for time series indices; this should not be confused with the (t)th power.

Factorisation

The model parameters to be learned are the variables U, V, u, v and b which determine how users and items are mapped to the K-dimensional trait space and how similarity in the trait space is mapped to a rank. Since the amount of data per user and/or per item is scarce, the recommender system maintains knowledge of the uncertainty about the unknown quantities. In some embodiments the knowledge about these parameters is stored at the recommender system in terms of factorising Gaussian probability distributions. Complete factorisation of all these parameters may then be assumed:

$$p(U) = \prod_{k=1}^{K} \prod_{i=1}^{n} N(u_{k,i}; \mu k, i, \sigma_{k,i}^2). \quad (4)$$

For each of the components of the matrices U and V and each of the components of the vectors u, v and b, the recommender system maintains a Gaussian belief. Given a stream of ranking triples (x,y,l) approximate posterior distributions for the parameters are learned using an example inference method discussed below.

As mentioned above, for each observed rating, a small factor graph is formed in memory by the recommender system. More detail about the process of forming the factor graph is now given with reference to FIG. 8. The factor graph comprises nodes 802, 803, 804, 805 connected by links 801. The nodes are either variable nodes (circles) or factor nodes (rectangles). Variable nodes represent storage locations and factor nodes represent computational units. The factor nodes read and write information to their neighboring variable nodes according to calculation rules described later.

Figure 8:
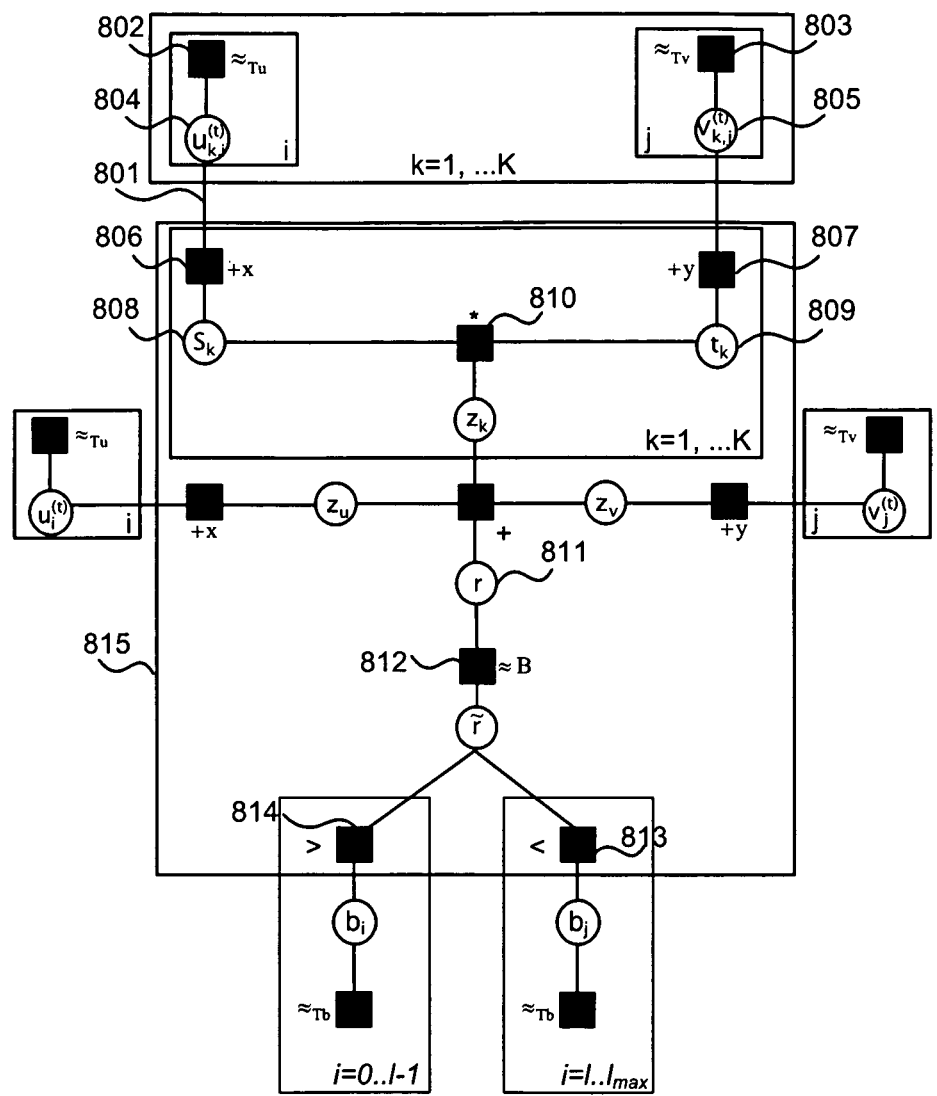
FIG. 8 is an example factor graph.

The factor graph of FIG. 8 is for a single rating triple (x, y, l). In this example, all the variables are one dimensional Gaussian variables. The factor nodes 802, 803 at the top of the diagram are functions which access a database or other store to obtain belief distributions for the user traits 802 and item traits 803. These computational units feed parameters describing the trait belief distributions into the corresponding variable nodes 804, 805.

A weighted sum is carried out represented by factor nodes 806 and 807 to obtain the latent user trait 808 and latent item trait 809 belief distributions.

A product factor labeled * in FIG. 8 (reference numeral 810) is applied to take the inner product of the latent user trait and latent item trait and obtain the latent rating 811. Z_k is the result of the product for trait k. The variance of the belief distribution for the latent rating may be increased using the factor 813 ($\approx\beta$) which can be thought of as adding noise to the distribution. Similarly, factors 812 ($\approx\gamma$) add noise.

The shaded box 815 of FIG. 8 indicates the part of the factor graph which may be considered as a factor-node itself which performs its message update equations by iterating message passing within. This structure of the factor graph is particularly useful for enabling the recommender system to use parallel processing.

The factor graph of FIG. 8 is a data structure which may be physically represented in memory in a computer system arranged to provide the recommender system. It is formed by the recommender system in order to specify the model of equations (1), (2), (3) and (4) above. In FIG. 8, plate notation is used as a short-hand for replicating parts of the factor graph over the user variables i∈{1, . . . , n}, item variables j∈{1, . . . , m} and latent trait space dimensions k∈{1, . . . , K}. Inference in this model is performed using message passing along the edges of the graph using the sum-product algorithm as described in F. R. Kschischang, B. Frey and H.-A. Loeliger "Factor graphs and the sum-product algorithm", IEEE Trans. Inform. Theory, 47(2):498-519, 2001, which is incorporated herein by reference in its entirety.

The process of message passing comprises carrying out a calculation associated with a factor node (square node in FIG. 8) using distribution parameters from neighbouring variable nodes and passing the results to one of the neighbouring variable nodes (circular nodes in FIG. 8). The direction of passing the results (also referred to as a processing schedule) is explained in more detail now.

The processing schedule is preferably divided into three phases: pre-processing, chain processing, and post-processing. An example pre-processing schedule starts at the top factor nodes (802, 803). Computation proceeds downward along each column until the s and t variables are reached (nodes 808 and 809). The post processing schedule is the reverse of the pre-processing schedule but stopping at the trait nodes 804, 805. The chain processing schedule involves iterating the calculations of the messages within region 815 of FIG. 8 until their values no longer change substantially.

Each message that is passed in the processing schedules represents a non-trivial calculation and details of those calculations are given below. General update equations for use in carrying out the computations along the arrows in the message passing process are now given. Those general update equations are tailored for use with Gaussian distributions as shown.

Factor Node Update with Gaussian Messages

Consider the factor graph of FIG. 10.

Suppose it is required to update the message $m_{f \to x}$ and the marginal $p_x$. Then, the general update equations are as follows:

$$m_{x \to f}(x) \propto \frac{p_x(x)}{m_{f \to x}(x)},$$

$$m_{f \to x}^{true}(x) \propto \int \int f(x, y, z) \cdot \frac{P_y(y)}{m_{f \to y}(y)} \cdot \frac{P_z(z)}{m_{f \to z}(z)} dy dz$$

$$p_x(x) = MM[m_{f \to x}^{true}(x) m_{x \to f}(x)],$$

$$m_{f \to x}(x) \propto \frac{p_x(x)}{m_{x \to f}(x)},$$

where MM[.] returns the distribution in the Gaussian family with the same moments as the argument and all quantities on the right are normalized to be distributions. In the following the exponential representation of the Gaussian is used, that is, $$G(x; \tau, \pi) \propto \exp(\pi x^2 - 2\tau x)$$

This density has the following relation to the standard density $$G(x; \tau, \pi) = N\left(x; \frac{\tau}{\pi}, \frac{1}{\pi}\right),$$

or $$N(x; \mu, \sigma^2) = G\left(x; \frac{\mu}{\sigma^2}, \frac{1}{\sigma^2}\right)$$

Figure 12:
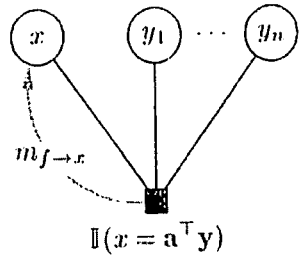

In the case of exact factor nodes the update equations are given in FIGS. 11 and 12. In the case of order factor nodes such as 813 and 814 in FIG. 8, the update equations are given in FIG. 13.

In these update equations the symbol a represents weightings which in a preferred example are set to 1. Also, in the update equations v and w correspond to:

$$V(t) = \frac{N(t)}{\Phi(t)}$$

$$w(t) = V(t) \cdot (V(t) + t)$$

The following approximate message equations may be used for the product factor 810. $f(s_k, t_k, z_k)$=identity function $(z_k = s_k \cdot t_k)$. For the rest of this paragraph the index of the latent dimension, k, is dropped and the equations below correspond to a single latent dimension.

$$m_{* \to z} = N(z; \langle s \rangle \langle t \rangle, \langle s^2 \rangle \langle t^2 \rangle - \langle s^2 \rangle \langle t^2 \rangle), \quad (6)$$

$$m_{* \to s} = N\left(s; \frac{\langle z \rangle \langle t \rangle}{\langle t^2 \rangle}, \frac{\langle z^2 \rangle - \langle z \rangle^2}{\langle t^2 \rangle}\right), \quad (7)$$

Here, $\langle \rangle$ denotes the mean of the marginal p(t) and $\langle t^2 \rangle$ denotes the non-centred second moment of the message marginal p(t). Marginals are used for the inputs for the product factor as this update is a Variational approximation instead of an EP approximation (unlike the other factors in the model). These marginals may be obtained by multiplying all messages into the s and t variables (including the upward messages), hence the process of iterating the computation until convergence. The upward messages into the s and t variables are not initially available so in the first iteration these may be set to uniform distributions. The message for $m^*_{\to t}$ is obtained from $m^*_{\to s}$ by swapping the roles of s and t. $\langle z \rangle$ denotes the mean of the message from the sum factor upwards to the zk variable.

In some embodiments assumed density filtering is used whereby the processing schedule is arranged such that the inference algorithm only passes messages forward in time.

In the example of FIG. 8, in order to carry out prediction on a new pair of user x and item y, the recommender system is arranged to loop through all L possible values for the rank and compute the evidence of the full factor graph. Due to the approximate nature of the factors >, < and *, the sum of all evidences is not one and evidences may be re-normalised to arrive at a predictive probability, $\pi_l$=p(1|,x,y,D). D represents the whole sequence of ranking triples in a training set.

For a single point prediction θ the numbers $\pi_l$ may be used to minimise the expectation of a given cost function. For example, for the mean-squared error the following expected loss $L_{MSE}(\theta, \pi) = \Sigma \pi_i (\theta - i)^2$ may be minimised for $\theta^*_{MSE}(\pi) = \Sigma i \pi_i$.

Parallel Inference

The message passing process may be parallelised by exploiting that the incoming messages from a variable to a factor, $m_{i \to f}$, are ideally computed by dividing a cache of $p(u_i)$ by the message $m_{f \to i}$. Hence, as long as both the cache $p(u_i)$ and the incoming message $m_{f \to i}$ are updated in one atomic step, computations based on various messages from variables $u_i$ to $m_{i \to f}$ can be parallelised. Thus, all the message exchanges within box 815 in FIG. 8 may be performed in parallel over all triples provided that the updates of the messages and cached marginals over all elements in U, V, u, v and b are performed with a read-write lock. This can lead to a nearly linear performance increase over the number of cores in modern computers.

Figure 9:
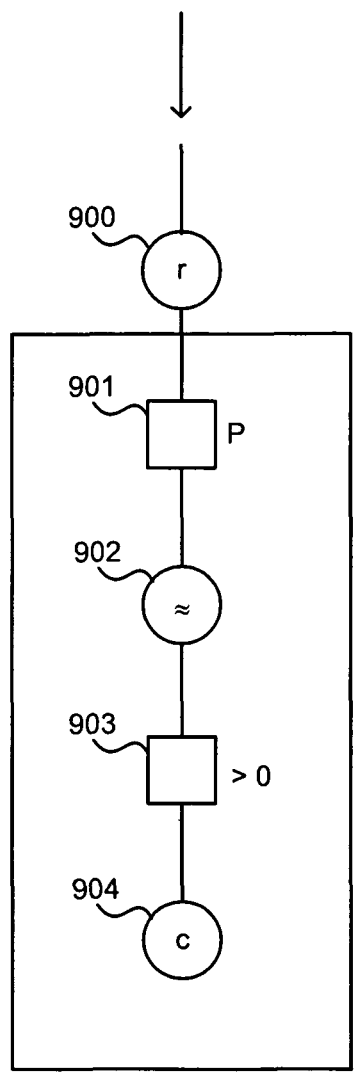
FIG. 9 is an example factor graph for use in predicting click events.

FIG. 9 shows part of another factor graph which may be formed by the recommender system in order to predict click events. The factor graph of FIG. 8 is used up to node 811 which is the same as node 900 of FIG. 9. Noise is added to the belief distribution for the latent rating as indicated by factor node 901. The results are stored at variable node 902. A factor node 903 is used to introduce a test as to whether the latent rating is positive. If so, a click event is predicted and the result stored at variable node 904.

Figure 14:
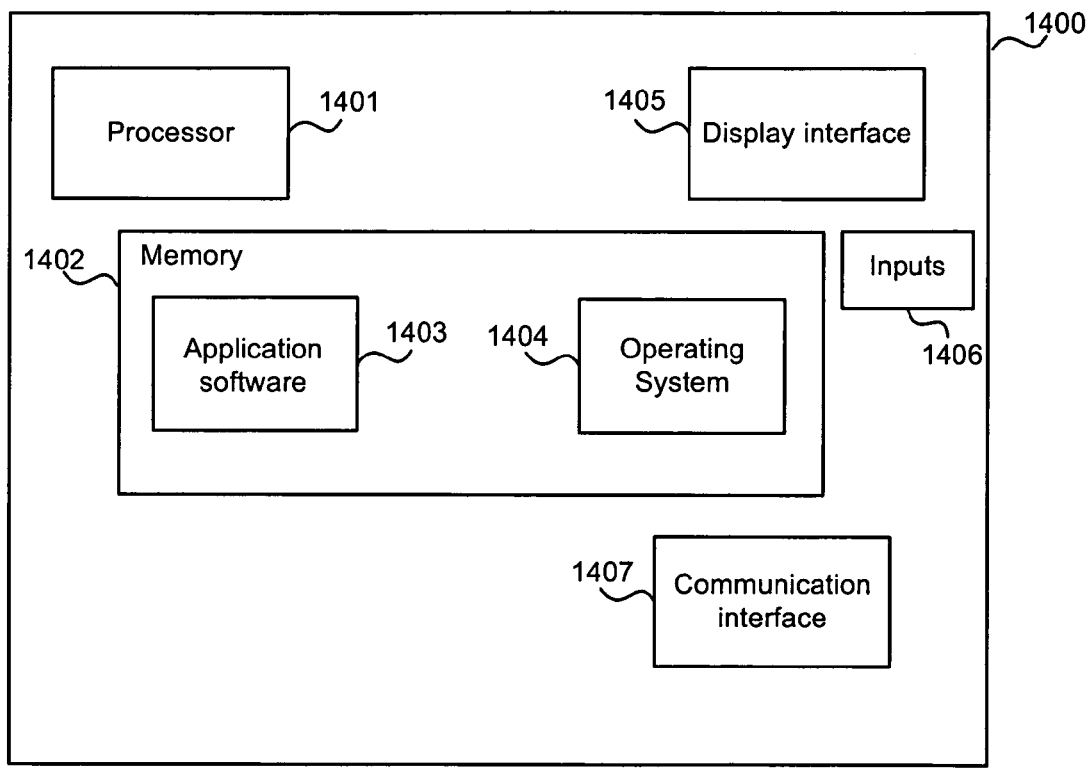
FIG. 14 illustrates an exemplary computing-based device in which embodiments of a recommender system may be implemented.

FIG. 14 illustrates various components of an exemplary computing-based device 1400 which may be implemented as any form of a computing and/or electronic device, and in which embodiments of a recommender system may be implemented.

The computing-based device 1400 comprises one or more inputs 1406 which are of any suitable type for receiving media content, Internet Protocol (IP) input, and including observed ratings, information about users and information about items. The device also comprises communication interface 1407 to enable the recommender system to access and communicate with other entities such as databases, search engines, web servers and the like.

Computing-based device 1400 also comprises one or more processors 1401 which may be microprocessors, controllers or any other suitable type of processors for processing computing executable instructions to control the operation of the device in order to recommend items to users. Platform software comprising an operating system 1404 or any other suitable platform software may be provided at the computing-based device to enable application software 1403 to be executed on the device.

The computer executable instructions may be provided using any computer-readable media, such as memory 1402. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of predicting a user behavior with respect to an item, the method comprising:
    arranging a memory to store a factor graph specifying a bi-linear collaborative filtering model, wherein the factor graph is updated based on:
        one or more latent user traits, the latent user traits including one or more demographic traits;
        one or more latent item traits, the latent item traits including one or more product feature descriptions or service feature descriptions; and
        a determination of an inner product of at least one latent user trait and at least one latent item trait, the factor graph comprising a plurality of probability distributions representing belief about the one or more latent user traits and the one or more latent item traits of the bi-linear collaborative filtering model;

predicting the user behavior with respect to a plurality of different user and item pairs by arranging a first processor to apply an inference process to the factor graph;

recommending, via an output, at least one of the plurality of items to the user based at least in part on the predicted user behavior; and updating a variance of the plurality of probability distributions based at least in part on actual user behavior.

2. A method as claimed in claim 1, wherein the inference process comprises an assumed density filtering process.

3. A method as claimed in claim 1, further comprising:

receiving information that includes a first plurality of observed user behaviors from a first specified set of items and a second plurality of observed user behaviors from a second specified set of items, each observed user behavior having associated user features and associated item features;

arranging the first processor to update the factor graph based at least in part on the first plurality of observed user behaviors from the first specified set of items;

arranging a second processor to concurrently update the factor graph based at least in part on the second plurality of observed user behaviors from the second specified set of items; and arranging a monitor to prevent a conflict in the concurrent updates.

4. A method as claimed in claim 1, wherein the first processor is arranged to update a variance of the plurality of probability distributions at specified time intervals.

5. An apparatus for recommending one or more items to a user, the apparatus comprising:

a memory arranged to store a factor graph specifying a bi-linear collaborative filtering model of user behavior, the factor graph being updated based on:

one or more latent user traits, the latent item traits including one or more product feature descriptions or service feature descriptions;

one or more latent item traits, the latent item traits including one or more product feature descriptions or service feature descriptions; and a determination of an inner product of at least one latent user trait and at least one latent item trait;

a first processor configured to apply an inference process to the factor graph in order to predict, for each of a plurality of items, a user behavior based at least in part on the inner product, the factor graph comprising a plurality of probability distributions representing belief about the one or more latent user traits and the one or more latent item traits-of the bi-linear collaborative filtering model; and an output configured to recommend at least one of the plurality of items to the user based at least in part on the predicted user behavior and to update a variance of the plurality of probability distributions based at least in part on actual user behavior.

6. An apparatus as claimed in claim 5 wherein the inference process comprises an assumed density filtering process.

7. An apparatus as claimed in claim 5, further comprising an input arranged to receive information that includes an observed user behavior together with associated user features and associated item features, and wherein the first processor is arranged to update the factor graph based at least in part on the received information.

8. An apparatus as claimed in claim 5, further comprising:

a first input arranged to receive information that includes a first plurality of observed user behaviors from a first specified set of items each having associated user features and associated item features, and wherein the first processor is arranged to update the factor graph based at least in part on the first plurality of observed user behaviors;

a second input arranged to receive information that includes a second plurality of observed user behaviors from a second specified set of items each having associated user features and associated item features;

a second processor arranged to concurrently update the factor graph based at least in part on the second plurality of observed user behaviors; and a monitor arranged to prevent conflict in the concurrent updates.

9. A method as claimed in claim 1, further comprising providing one or more item recommendations to the user based at least in part on the predicted user behavior.

10. A method as claimed in claim 9, further comprising:

learning at least two predicted rating thresholds for the user; and determining the one or more item recommendations using the at least two predicted rating thresholds.

11. An apparatus as claimed in claim 5, wherein the output is further arranged to learn at least two predicted rating thresholds for a particular user and determine the at least one recommended item using the at least two predicted rating thresholds.

12. One or more storage media, the one or more storage media being hardware, storing computer-readable instructions that when executed by one or more processors perform actions comprising:

arranging a memory to store a factor graph specifying a bi-linear collaborative filtering model, wherein the factor graph is updated based on:

one or more latent user traits, the latent user traits including one or more demographic traits;

one or more latent item traits, the latent item traits including one or more product feature descriptions or service feature descriptions; and a determination of an inner product of at least one latent user trait and at least one latent item trait, the factor graph comprising a plurality of probability distributions representing belief about the one or more latent user traits and the one or more latent item traits-of the bi-linear collaborative filtering model;

predicting the user behavior with respect to a plurality of different user and item pairs by arranging a first processor to apply an inference process to the factor graph;

recommending, via an output, at least one of the plurality of items to the user based at least in part on the predicted user behavior; and updating a variance of the plurality of probability distributions based at least in part on actual user behavior.

13. One or more storage media as claimed in claim 12, wherein the inference process comprises an assumed density filtering process.

14. One or more storage media as claimed in claim 12, the actions further comprising:

receiving information that includes a first plurality of observed user behaviors from a first specified set of items and a second plurality of observed user behaviors from a second specified set of items, each observed user behavior having associated user features and associated item features;

arranging the first processor to update the factor graph based at least in part on the first plurality of observed user behaviors from the first specified set of items;

arranging a second processor to concurrently update the factor graph based at least in part on the second plurality of observed user behaviors from the second specified set of items; and arranging a monitor to prevent a conflict in the concurrent updates.

15. One or more storage media as claimed in claim 12, wherein the first processor is arranged to update a variance of the plurality of probability distributions at specified time intervals.

\* \* \* \* \*